(12) United States Patent
Suzuki

(10) Patent No.: US 9,854,128 B2
(45) Date of Patent: Dec. 26, 2017

(54) IMAGE FORMING APPARATUS AND IMAGE FORMING METHOD FOR DETECTING BAD BLOCKS IN AUXILIARY MEMORY

(71) Applicant: KYOCERA Document Solutions Inc., Osaka (JP)

(72) Inventor: Masahiro Suzuki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/039,401

(22) PCT Filed: Jan. 22, 2015

(86) PCT No.: PCT/JP2015/051591
§ 371 (c)(1),
(2) Date: May 25, 2016

(87) PCT Pub. No.: WO2015/115281
PCT Pub. Date: Aug. 6, 2015

(65) Prior Publication Data
US 2017/0214822 A1    Jul. 27, 2017

(30) Foreign Application Priority Data

Jan. 29, 2014    (JP) ................................. 2014-014163

(51) Int. Cl.
H04N 1/32        (2006.01)
H04N 1/21        (2006.01)
G06F 11/07       (2006.01)

(52) U.S. Cl.
CPC ....... *H04N 1/32443* (2013.01); *G06F 11/073* (2013.01); *H04N 1/2166* (2013.01); *H04N 2201/0094* (2013.01)

(58) Field of Classification Search
CPC ............... G06F 11/073; G06F 11/1612; G06F 11/1666; G06F 11/16; G06F 13/1657
See application file for complete search history.

(56) References Cited

U.S. PATENT DOCUMENTS 5,642,506 A        6/1997   Lee
6,246,537 B1 *     6/2001   Shirane .............. G11B 20/1217
                                                              360/135

(Continued)

FOREIGN PATENT DOCUMENTS

JP    2005-071303 A    3/2005
JP    2012-014570 A    1/2012

*Primary Examiner* — Nicholas Pachol
(74) *Attorney, Agent, or Firm* — Hawaii Patent Services; Nathaniel K. Fedde; Kenton N. Fedde

(57) ABSTRACT

Image forming apparatus 1 that shortens warm-up time is provided. Accordingly, image forming apparatus 1 is an asymmetrical multiprocessing configuration provided with auxiliary memory part 21 shared between main control part 10 and sub control part 11. Use area 300 is an area accessed by main control part 10. Use area 301 is an area accessed by sub control part 11. Use area specifying part 100 specifies for use area 300 and use area specifying part 101 specifies for use area 301, respectively, by use area specifying table 210. Defective area table making part 110 makes defective area table 200 by searching whether or not a defective area only for use area 300 and set as a defective area for the other area. Defective area table making part 111 makes defective area table 201 by searching use area 301, similarly, and set as the defective area for the other area.

4 Claims, 6 Drawing Sheets

(56) References Cited

U.S. PATENT DOCUMENTS

| | | | |
|---|---|---|---|
| 8,020,031 B1* | 9/2011 | Govande | G06F 11/0781 714/2 |
| 2009/0040825 A1* | 2/2009 | Adusumilli | G11C 29/846 365/185.09 |
| 2009/0049335 A1 | 2/2009 | Khatri et al. | |
| 2010/0232240 A1* | 9/2010 | Norman | G11C 5/02 365/200 |
| 2010/0318844 A1* | 12/2010 | Matsuda | G06F 11/0727 714/6.12 |
| 2012/0005436 A1* | 1/2012 | Kawano | G06F 12/0246 711/154 |
| 2013/0024607 A1* | 1/2013 | Park | G06F 12/0246 711/103 |
| 2015/0036169 A1* | 2/2015 | Suzuki | H04N 1/00928 358/1.14 |

* cited by examiner

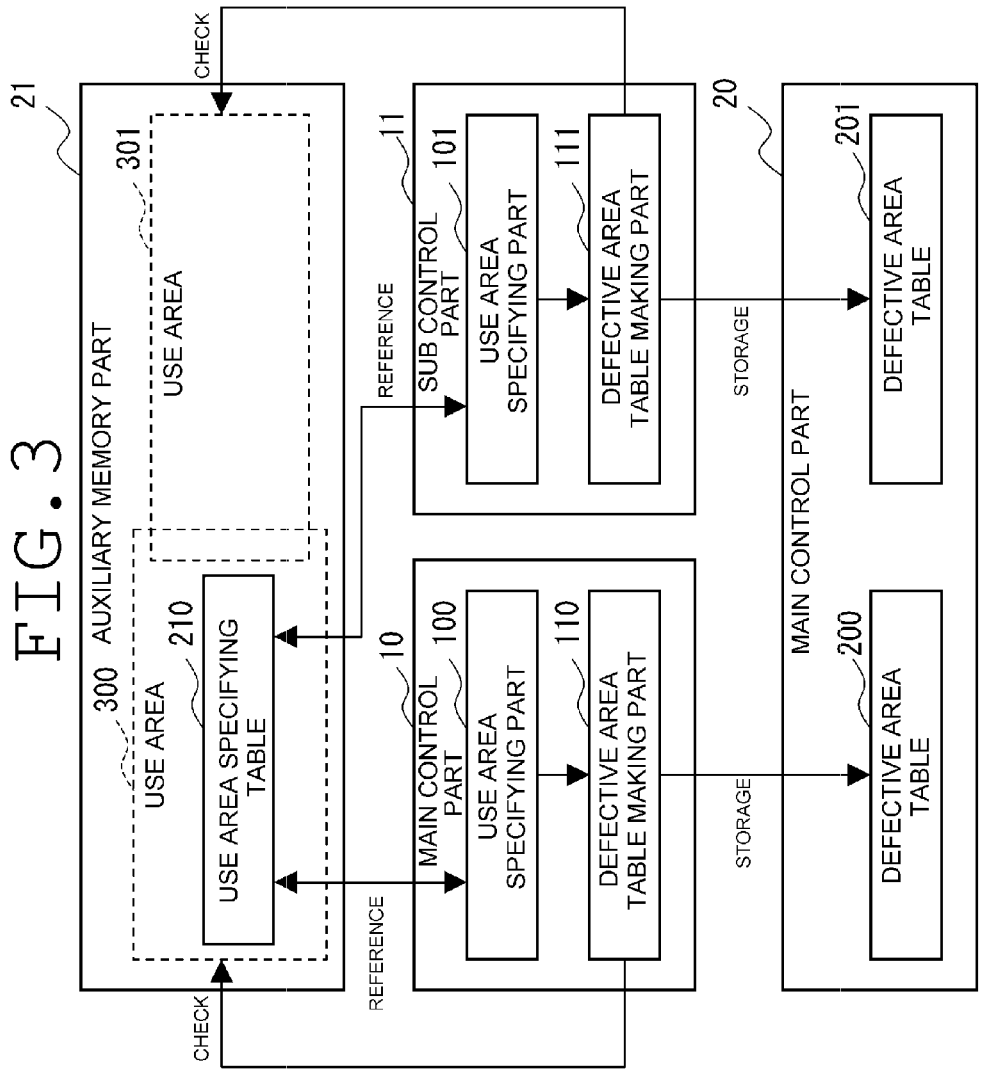

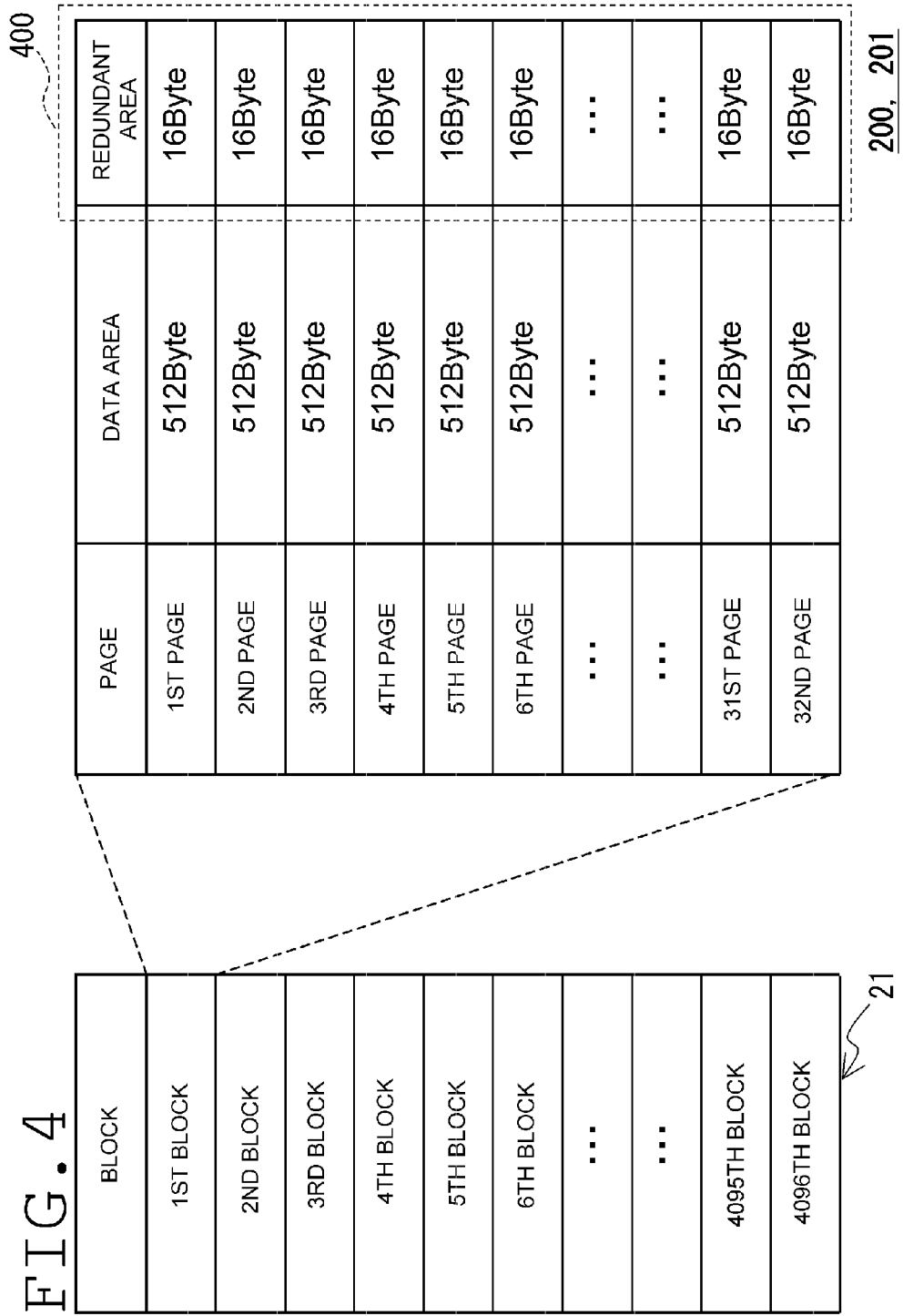

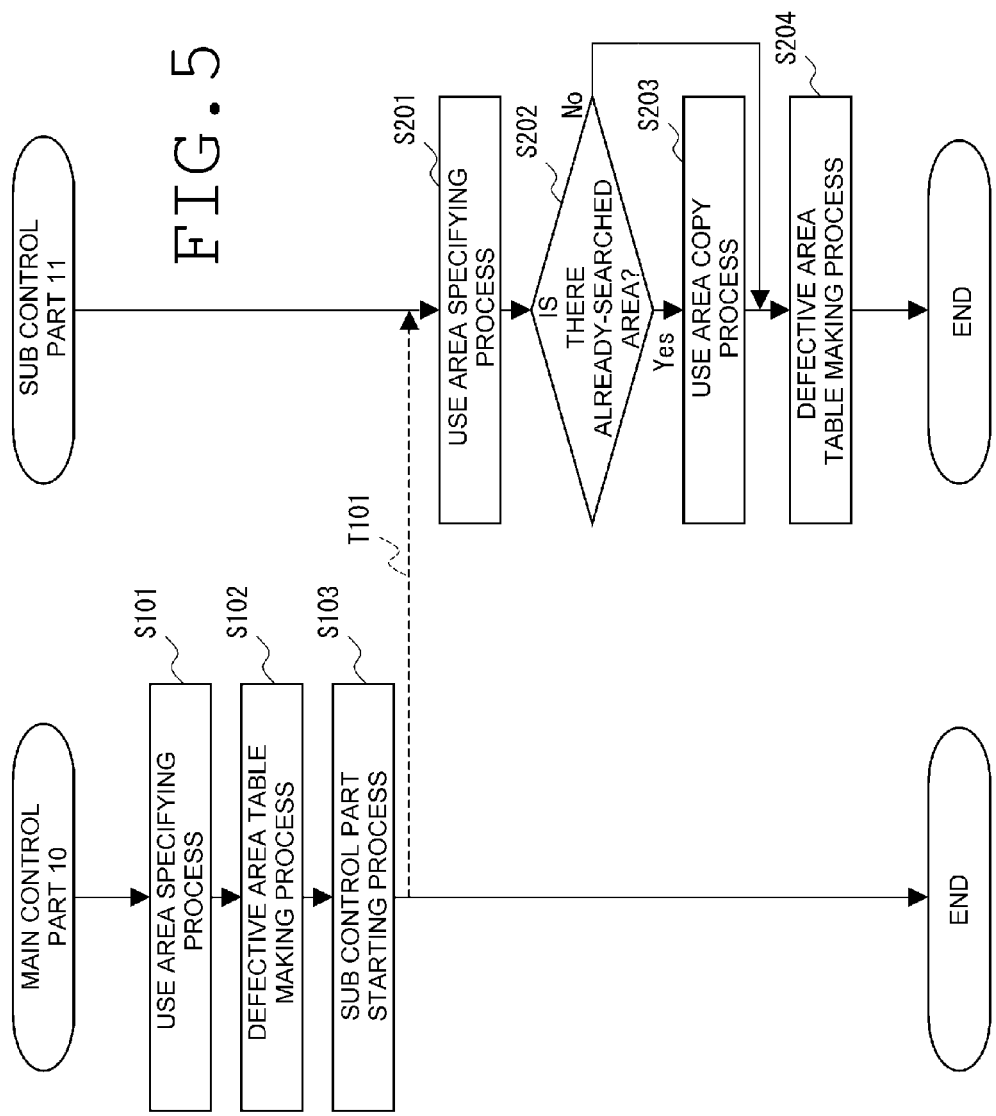

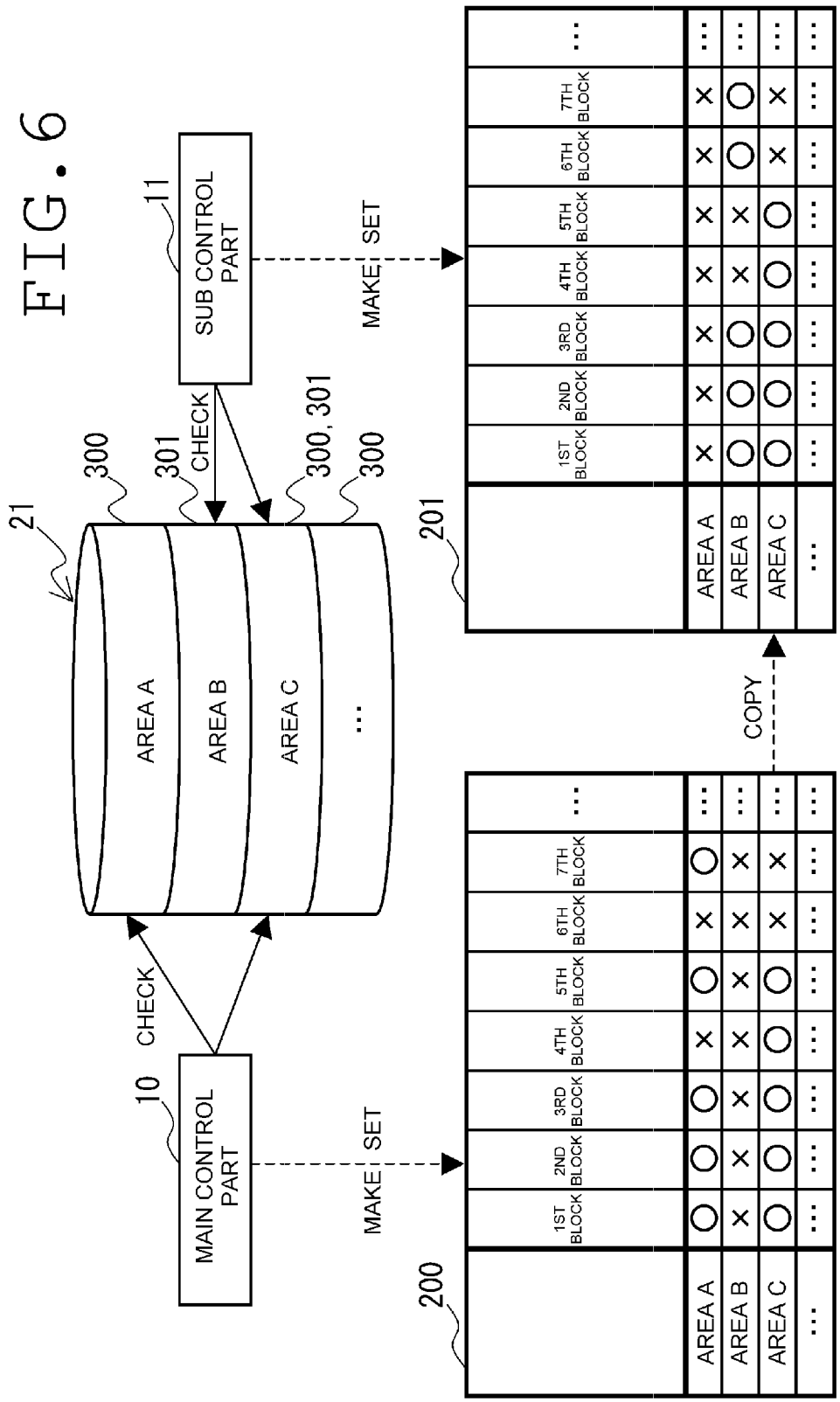

IMAGE FORMING APPARATUS AND IMAGE FORMING METHOD FOR DETECTING BAD BLOCKS IN AUXILIARY MEMORY

FIELD OF THE INVENTION

The present invention relates to an image forming apparatus and an image forming method, especially, an image forming apparatus and an image forming method having an auxiliary memory part.

BACKGROUND OF THE INVENTION

Typically, image forming apparatuses, such as an MFP (Multifunctional Peripheral, MFP) that can print a document and an image, are present.

There is an image forming apparatuses having an auxiliary memory part such as a NAND flash memory.

The auxiliary memory part such as a NAND flash memory may have limitation for time to rewrite, or a part of area for the memory may be damaged, physically. For this reason, it is necessary to detect a defective area.

As a patent document 1 is referred to, it is written a program starting equipment that includes: NAND flash memory that stores a start program and an executive program, CPU that performs control based on the executive program, a first means that executes the boot program based on the program previously stored regardless of operation of CPU, the memory for program execution that is provided with CPU to execute after the boot program is executed, second means that avoids use of the bad block of the flash memory and to transmit a program to the memory for executing during boot program execution time.

In the technology of the patent documents 1, even when the NAND flash memory is used as equipment for executing a CPU, an malfunction of the start-up of CPU by the bad block can be avoided.

PRIOR ART DOCUMENT

Patent Documents

Patent documents 1: JP 2005-71303 A

SUMMARY OF THE INVENTION

Problem(s) to be Solved by the Invention

However, for a case in the patent documents 1, in case of a configuration of asymmetrical multiprocessing where a control part, such as a CPU, is provided with a plurality of control parts, such as a multiprocessor and a multi core, and each of them executes a respective program, or the like (henceforth an "AMP configuration,") a defective area table corresponding to each control part is required to be made.

In this case, each control part needs to read information of all the defective areas in an auxiliary memory part, respectively at the time of start and needs to make the defective area table, and it causes delay the starting time.

The present invention is accomplished in view of such a situation, and a subject is to solve the above-mentioned problem.

Means for Solving the Problem

An image forming apparatus of the present invention is an image forming apparatus of asymmetrical multiprocessing provided with a plurality of control parts that control as a whole or a part, and a memory part that is shared among the a plurality of the control parts. The image forming apparatus is provided with a use area specifying part and a defective area table making part. The use area specifying part specifies a use area of the memory part where a program and data, which are accessed by self control part that is any one of the control parts, are memorized. The defective area table making part makes a defective area table for the self control part that is set a result of having searched whether or not a defective area for only about the use area of the memory part specified by the use area specifying part and is set as it is a defective area for other area in the memory part.

An image forming method of the present invention is executed by an image forming apparatus of asymmetrical multiprocessing provided with a plurality of control parts that control as a whole or a part, and a memory part that is shared among the plurality of control parts. First, it specifies a use area of the memory part where a program and data that are accessed by self control part, which is any one of the control parts are memorized. Then, it makes a defective area table for the self control part that is set a result of having searched whether or not a defective area for only about the use area of the specified memory part and is set as it is a defective area for other area of the memory part.

Effects of the Invention

According to the present invention, each control part makes the defective area table that is specified the use area of the auxiliary memory where the self control part accesses, and searched whether only this use area having been a defective area.

BRIEF DESCRIPTION OF THE DRAWINGS

FIG. 3 It is a block diagram showing a control configuration according to the embodiment of the image forming apparatus in the present invention.

FIG. 4 It is a conceptual diagram of an auxiliary memory part and a defective area table illustrated in FIG. 3.

FIG. 5 It is a flowchart of a defective area table making process according to the embodiment of the invention.

FIG. 6 It is a conceptual diagram of the defective area table making process illustrated in FIG. 5.

MODES FOR CARRYING OUT THE INVENTION

<Embodiment>
[The Configuration of the Whole Image Forming Apparatus 1]

Figure 1:
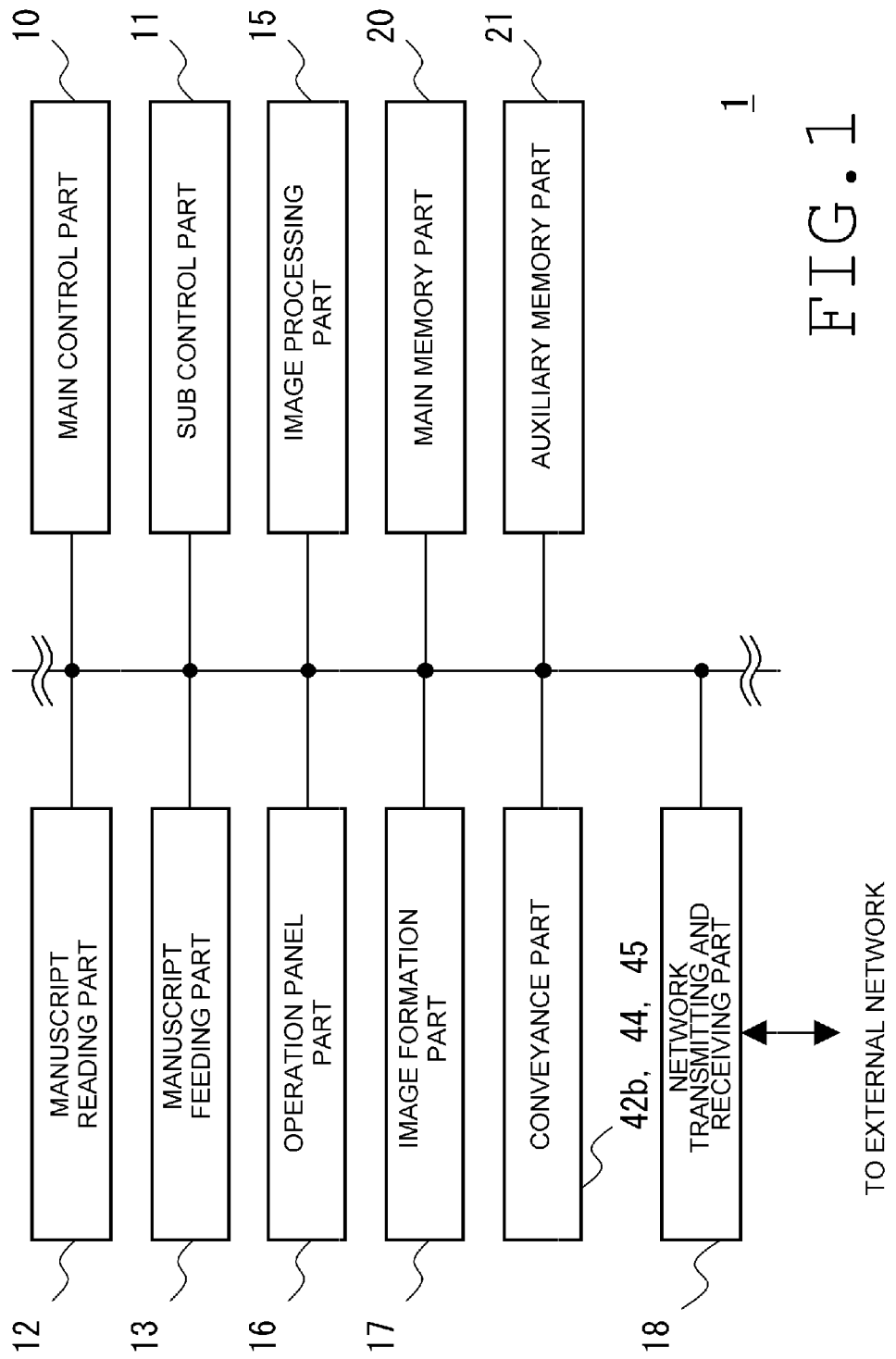
FIG. 1 It is a block diagram showing a configuration according to the embodiment of a whole of the image forming apparatus in the present invention.

First, as refer to FIG. 1, a configuration of a whole image forming apparatus 1 is described.

In image forming apparatus 1, main control part 10 (control part), sub control part 11 (control part), manuscript reading part 12, manuscript feeding part 13, a conveyance part (feed roller 42b, conveying roller 44, ejection roller 45), image processing part 15, network transmitting and receiving part 18, operation panel part 16, image formation part 17, main memory part 20 (memory part), auxiliary memory part 21 (memory part), or the like is connected by same or different bus, or the like. As for each part, as a whole or a part is operation controlled by main control part 10 and sub control part 11.

Main control part 10 and sub control part 11 are information processing parts, such as GPP (General Purpose Processor), CPU (Central Processing Unit), MPU (Micro Processing Unit), DSP (Digital Signal Processor), GPU (Graphics Processing Unit), ASIC (Application Specific Processor, a processor for particular applications). Main control part 10 and sub control part 11 read a control program memorized in ROM and HDD of auxiliary memory part 21, expand to main memory part 20, execute the control program, and operate as each part of a functional block as described later. Also, main control part 10 and sub control part 11 control a whole device according to specified instructions information inputted from a remote terminal (not shown) and operation panel part 16.

In addition, each of main control part 10 and sub control part 11 may not be a physical CPU, and may be one of an "arithmetic unit," which is a process unit, or the like, and is independently executable a kernel of OS (Operating System) in a CPU having a feature of a multi-core or a multi-thread.

Manuscript reading part 12 is a means to read (scan) a manuscript, which is set.

Manuscript feeding part 13 is a means to convey the manuscript read by manuscript reading part 12.

In addition, operation of manuscript reading part 12 and manuscript feeding part 13 are described later.

Image processing parts 15 are arithmetic controlling part, such as DSP (Digital Signal Processor) and GPU (Graphics Processing Unit). Image processing part 15 is a means to perform specified image processing for image data, and for example, it performs various image processing, such as scaling, density control, gradation adjustment, and an image improvement.

Image formation part 17 is a means to make perform image formation from data, which is memorized in main memory part 20 and auxiliary memory part 21 and is read by manuscript reading part 12, or is obtained from the external terminal by a user's output instruction, to a recording paper.

The conveyance part conveys a recording paper from sheet paper cassette 42a (FIG. 2), and makes perform image formation by image formation part 17, and conveys it to stack tray 50 after that.

In addition, an operation of the conveyance part and image formation part 17 is also described later.

Operation panel parts 16 has a display part, such as LCD, and an input part, such as a numeric keypad, a start key, a cancel key, buttons for switching operational modes for a copy, FAX transmission, a scanner, or the like, a button or a touch panel for performing instructions related to executing of a job about print, transmission, storage, record, or the like, for a selected document, or the like.

Operation panel part 16 accepts instructions of the various jobs of image forming apparatus 1 by a user. It is also possible to input and fix each user's information with the user's instructions accepted from operation panel part 16.

Network transmitting and receiving part 18 is a network connection means including a LAN board, a wireless transmitter and receiver, or the like, for connecting with an external network, such as LAN, wireless LAN, WAN, and a mobile phone network.

Network transmitting and receiving part 18 transmits and receives data in a data communications line, and transmits and receives a sound signal in a voice telephone line.

Main memory part 20 is a memory part as like a semiconductor memory, such as DRAM (Dynamic Random Access Memory), SRAM, and MRAM. Main memory part 20 memorizes a program and data read from auxiliary memory part 21.

Auxiliary memory parts 21 is a memory part, such as ROM (Read Only Memory), SSD (Solid State Drive), on-board semiconductor memory, and HDD (Hard Disk Drive). Auxiliary memory part 21 memorizes various programs and data.

In these, the semiconductor memory of auxiliary memory part 21 includes the nonvolatile memory such as EEPROM, NAND type or NOR type flash memory, MRAM, and ReRAM.

Also, in ROM and HDD in auxiliary memory part 21, a control program including a firmware for operation controlling image forming apparatus 1 is memorized. Also, an area of a storage folder for each user may be included in auxiliary memory part 21.

In addition, in image forming apparatus 1, main control part 10, sub control part 11, and image processing part 15 may be integrally form, such as CPU with built-in GPU, and a chip-on module package.

Also, image forming apparatus 1 may have a FAX transmission and reception part that transmits and receives a facsimile.

[Operation of Image Forming Apparatus 1]

Figure 2:
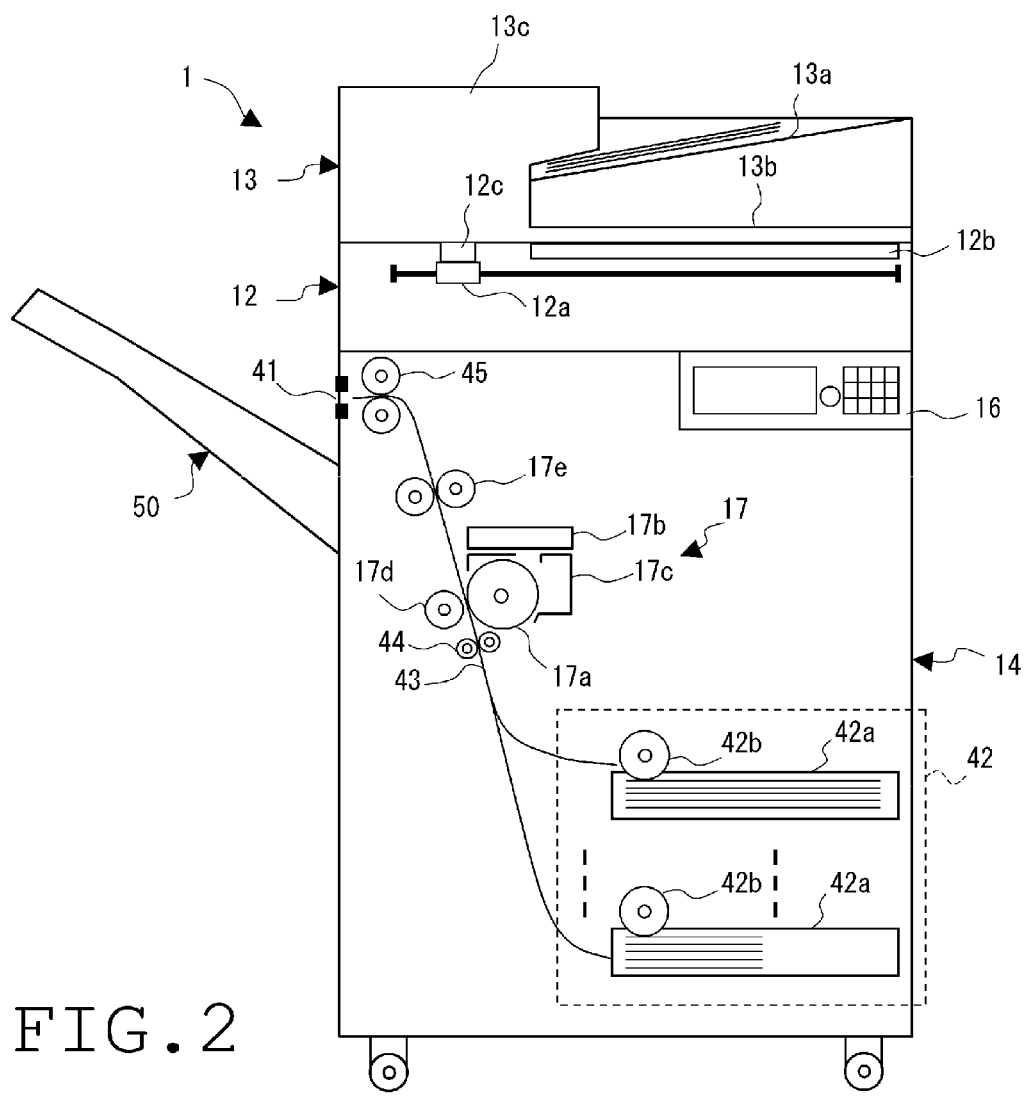
FIG. 2 It is a schematic diagram according to the embodiment of the image forming apparatus of the present invention.

Then, with reference to FIG. 2, operation of image forming apparatus 1 according to the embodiment of the invention is explained.

Manuscript reading part 12 is allocated on an upper part of body part 14, and manuscript feeding part 13 is allocated on an upper part of manuscript reading part 12. Stack tray 50 is allocated in a side of discharge opening 41 for recording paper formed in body part 14, and, also, operation panel part 16 is allocated in a front-side of image forming apparatus 1.

Manuscript reading part 12 has scanner 12a, platen glass 12b, and manuscript reading slit 12c. Scanner 12a is configured to have an exposure lamp, an imaging sensor by using CCD (Charge Coupled-Device), CMOS (Complementary Metal Oxide Semiconductor), or the like, and is movable along to transportation direction of the manuscript by manuscript feeding part 13.

Platen glass 12b is the manuscript stand that is configured a transparent members, such as glass. Manuscript reading slit 12c has a slit formed orthogonal orientation for the transportation direction of the manuscript by manuscript feeding part 13.

To read the manuscript placed on platen glass 12b, scanner 12a is moved to the position that faces platen glass 12b, the manuscript is read by scanning the manuscript placed on platen glass 12b, the image data is obtained, and the obtained image data is outputted to body part 14.

Also, to read the manuscript conveyed by manuscript feeding part 13, scanner 12a is moved to the position that faces manuscript reading slit 12c, through manuscript reading slit 12c, a manuscript is read with synchronizing the conveying action of the manuscript by manuscript feeding part 13, the image data is obtained, and the obtained image data is outputted to body part 14.

Manuscript feeding part 13 is provided with manuscript mounting part 13a, manuscript discharge part 13b, and manuscript transport mechanism 13c. The manuscript placed in manuscript mounting part 13a is fed out one sheet at a time in order by manuscript transport mechanism 13c, is conveyed to a position that faces manuscript reading slit 12c, and is discharged by manuscript discharge part 13b.

In addition, manuscript feeding part 13 is configured as retractable, and the upper surface of platen glass 12b can be opened widely by lifting up manuscript feeding part 13.

Body part 14 is image formation part 17 and has feeding part 42, paper sheet conveying path 43, conveying roller 44, and ejection roller 45. Feeding part 42 includes a plurality of sheet paper cassettes 42a that contains recording papers having different direction and size, respectively, and feed roller 42b that feeds out one sheet of recording paper at a time to paper sheet conveying path 43 from sheet paper cassette 42a. Feed roller 42b, conveying roller 44, and ejection roller 45 function as a conveyance part. The recording paper is conveyed by this conveyance part.

The recording paper fed out to paper sheet conveying path 43 by feed roller 42b is conveyed by image formation part 17 with conveying roller 44. Then, the recording paper recorded by image formation part 17 is discharged to stack tray 50 by ejection roller 45.

Image formation part 17 includes photo conductor drum 17a, exposure part 17b, developing part 17c, transfer part 17d, and fixing part 17e. Exposure part 17b is an optical unit having a laser device, a mirror, a lens, an LED array, or the like, outputs light, or the like, based on image data, exposes photo conductor drum 17a, and forms an electrostatic latent image on a surface of photo conductor drum 17a. Developing part 17c is a development unit that develops the electrostatic latent image formed on photo conductor drum 17a by using toner and thus makes a toner image based on the electrostatic latent image form on photo conductor drum 17a. Transfer part 17d makes the recording paper transfer the toner image formed on photo conductor drum 17a by developing part 17c. Fixing part 17e heats the recording paper, which the toner image is transferred by transfer part 17d, and the toner image is fixed to the recording paper.

[The Control Configuration of Image Forming Apparatus 1]

As refer to FIG. 3, the configuration of main control part 10, sub control part 11, main memory part 20, and auxiliary memory part 21 at the time of start-up is described.

Main control part 10 and sub control part 11 of image forming apparatus 1 are executed with an AMP configuration, and respective memory space is set to main memory part 20. Accordingly, the control program executed by main control part 10 and the control program executed by sub control part 11 do not read or write (access) the data that is in the address of mutual memory space, usually. However, as described later, as defective area tables 200 and 201, accessing mutually is possible. Also, auxiliary memory part 21 is divided in areas, such as a partition and a block, and thus, main control part 10 and sub control part 11 do not mutually access the same area, usually.

Main control part 10 has use area specifying part 100 and defective area table making part 110.

Sub control part 11 has use area specifying part 101 and defective area table making part 111.

Defective area tables 200 and 201 are made and memorized in main memory part 20.

As for auxiliary memory part 21, use area 300 and use area 301 are set, and use area specifying table 210 is memorized.

Use area specifying parts 100 and 101 specifies use areas 300 and 301 in auxiliary memory part 21.

Use area specifying part 100 specifies use area 300 where a program and data accessed by main control part 10 are memorized by use area specifying table 210.

Use area specifying part 101 specifies use area 301 where a program and data accessed by sub control part 11 are memorized by use area specifying table 210.

Defective area table making parts 110 and 111 make defective area tables 200 and 201.

Defective area table making part 110 makes defective area table 200 that is set a result of having searched whether or not a defective area only for use area 300 and is set as it is a defective area for the other area in auxiliary memory part 21.

Also, defective area table making part 110, when a self control part is main control part 10 and exists defective area table 201 for sub control part 11, which is another control part, in addition when the area having already searched whether or not it is the defective area in defective area table 201 is common to the area in use area 300 for main control part 10 specified by use area specifying part 100, reads the data of a respective searched area in defective area table 201 for sub control part 11, and sets to defective area table 200 for main control part 10.

Defective area table making part 111 makes defective area table 201 that is set the result of having searched whether or not a defective area only for use area 301 and is set as a defective area for the other area in auxiliary memory part 21. Also, defective area table making part 111, when a self control part is sub control part 11 and exists defective area table 200 for main control part 10, which is another control part, in addition when the area having already searched whether or not it is a defective area in respective defective area table 200 is common to the area in use area 301 for sub control part 11 specified by use area specifying part 101, reads the data of a respective searched area in defective area table 200 for main control part 10, and sets to defective area table 201 for sub control part 11.

Also, defective area table making part 110 may make main memory part 20 expand a control program, or the like, and may start sub control part 11. Similarly, defective area table making part 111 may start main control part 10.

Defective area tables 200 and 201 are data of the table for managing the defective area of auxiliary memory part 21, or the like. Defective area tables 200 and 201 may bad block tables that manage a bad block if auxiliary memory part 21 is a NAND flash memory.

Defective area table 200 is set the searched result whether or not it is the defective area only for use area 300 corresponding to the program and data that main control part 10 uses and is set as the defective area for the other area.

Defective area table 201 is set the searched result whether or not it is the defective area only for use area 301 corresponding to the program and data that sub control part 11 uses and is set as the defective area for the other area.

Defective area tables 200 and 201 may be made in a common format. Also, the detailed configuration of defective area tables 200 and 201 is described later.

Use area specifying table 210 is data that information of area, such as a partition and a block in auxiliary memory part 21 for main control part 10 and sub control part 11 being use, respectively, is set. As the information of area, it may be information that the address of auxiliary memory part 21 for the partition table, the block table, or the like, is set. Also, the address may be a physical address or may be a logical address.

Use areas 300 are areas, such as a partition and a block, where the program and data accessed by main control part 10 are memorized in auxiliary memory part 21.

Use areas 301 are areas, such as a partition and a block, where the program and data accessed by sub control part 11 are memorized in auxiliary memory part 21.

In addition, in use area 300 and use area 301, the same area in auxiliary memory part 21 may be included.

Otherwise, the control program and data of the firmware for image forming apparatus 1, or the like, are memorized in auxiliary memory part 21. The firmware includes a boot loader, such as IPL (Initial Program Loader) that is read immediately after starting and initializes hardware, OS (Operating System), or the like. OS executes API (Application Programming Interface) for mediating application software (not shown), or the like, and manages hardware and software resource.

In main memory part 20, at the time of starting, the boot loader and the OS are expanded and memorized from auxiliary memory part 21. Main control part 10 executes a boot loader and OS and it functions as use area specifying part 100 and defective area table making part 110. Also, sub control part 11 executes a boot loader and OS, and it functions as use area specifying part 101 and defective area table making part 111. In this case, image forming apparatus 1 has an AMP configuration, main control part 10 and sub control part 11 execute a kernel of OS, respectively.

Also, auxiliary memory part 21 may be a configuration, for the boot loader and for OS as described later and for the other programs and the data, equips respective auxiliary memory parts.

Also, main control part 10 and sub control part 11 may contain RAM, ROM, a flash memory, or the like. In this case, main control part 10 may memorize use area specifying part 100 and defective area table making part 110 in ROM. Also, sub control part 11 may memorize use area specifying part 101 and defective area table making part 111 in ROM.

Also, as above-mentioned, each part of image forming apparatus 1 serves as hardware resources that execute the image forming method according to an embodiment of the invention.

Then, as refer to FIG. 4, it explains the details of defective area tables 200 and 201.

FIG. 4 shows an example of defective area tables 200 and 201 in case auxiliary memory part 21 is a small block type NAND flash memory having 64 MByte, for example.

In NAND flash memory, writing and reading are performed in a unit called a block. The block is further subdivided by a unit called a page.

NAND flash memory has restriction of the number of times for rewriting. If NAND flash memory exceeds the restriction of the number of times for rewriting, a possibility that is not completed writing within a prescribed period becomes larger. Thus, it will be an error if writing, elimination, or the like, are performed for a "bad block," which is the block including the page in the state where writing is not completed within the prescribed period. Therefore, it is necessary to specify a bad block as a defective area and to avoid from the memory management of auxiliary memory part 21.

The information of the bad block is memorized in redundant area 400, which is present for each block. The data in which all the blocks of the redundant area 400 are read on main memory part 20 is made as a table and serves as defective area tables 200 and 201.

[Defective Area Table Making Process in Image Forming Apparatus 1]

Then, with reference to FIG. 5 and FIG. 6, the defective area table making process in image forming apparatus 1 according to an embodiment of the invention is explained.

In the defective area table making process in the present embodiment, main control part 10 and sub control part 11 make defective area tables 200 and 201 during an execution time of a start processing, respectively. In this case, since the area of auxiliary memory part 21 that each of main control part 10 and sub control part 11 accesses is limited, a defective area only for the area of auxiliary memory part 21 that a self control part accesses is searched, and it makes defective area tables 200 and 201. Further, for the areas that main control part 10 and sub control part 11 does not access, respectively, they are not searched in auxiliary memory part 21, sets up as a defective area in order not to be accessed, uniformly, and also prevents destruction of the memory content by malfunctions, such as a error of a control program.

In the defective area table making process in the present embodiment, main control part 10 and sub control part 11 expand the control program memorized in auxiliary memory part 21 to main memory part 20, collaborate with each part, and execute by using hardware resources.

In the following, with reference to the flow chart of FIG. 5, the details of the defective area table making process are explained for each step.

(Step S101)

Firstly, main control part 10 as use area specifying part 100 performs a use area specifying process.

Main control part 10 expands the boot loader, or the like, which is memorized in auxiliary memory part 21, to main memory part 20, and starts executing.

Then, main control part 10 reads the address of auxiliary memory part 21 that main control part 10 uses, or the like, from use area specifying table 210, and specifies use area 300.

According to the example of FIG. 6, main control part 10 specifies "area A" and "area C" as use area 300.

(Step S102)

Then, main control part 10 as defective area table making part 110 performs a defective area table making process.

Main control part 10 searches redundant area 400 (FIG. 4) for each block set as use area 300 in auxiliary memory part 21, and it makes defective area table 200 by reading to main memory part 20. Main control part 10, about a block in which the information of the bad block in redundant area 400 is included at least one, sets as a defective area to defective area table 200, and it makes not to use as a block unit. Also, for areas other than use area 300 of auxiliary memory part 21, main control part 10 sets as a defective area to defective area table 200.

According to the example of FIG. 6, in defective area table 200, for "area A" and "area C," main control part 10 searches a defective area and sets it to defective area table 200. The example of FIG. 6 shows that "O" is not a defective area and "x" is a defective area. The defective area is accessed from neither OS nor application software. Also, for "area B," main control part 10 sets all the areas to "x," which is a defective area.

(Step S103)

Then, main control part 10 as defective area table making part 110 performs a sub control part starting process.

Main control part 10 expands the boot loader, or the like, which sub control part 11 executes, to main memory part 20 and makes start the sub control part 11 from the idle state of HALT, or the like, by performing reset, or the like (timing T101).

(Step S201)

Here, sub control part 11 as use area specifying part 101 performs a use area specifying process.

Sub control part 11 starts executing of the boot loader, or the like, which is expanded by main memory part 20.

Then, sub control part 11 reads the address on auxiliary memory part 21 that sub control part 11 uses, or the like from use area specifying table 210, and is specified of use area 301.

According to the example of FIG. 6, sub control part 11 is specified of "area B" and "area C" as use area 301.

(Step S202)

Then, sub control part 11 as defective area table making part 111 determines whether or not there is any area where the defective area is already searched in auxiliary memory part 21. Sub control part 11 searches whether or not there is any common area among the address of use area 300 for main control part 10 and the address of use area 301 for sub control part 11, or the like, by using area specific table 210. If the common area exists, sub control part 11 determines to Yes as the defective area is already searched. If the common area does not exist, sub control part 11 determines to No as there is no already-searched defective area.

For the example in FIG. 6, since "area C" is common area in use area 300 and use area 301, sub control part 11 determines to Yes.

In Yes, sub control part 11 advances a process to Step S203.

In No, sub control part 11 advances a process to Step S204.

(Step S203)

When there is an area where the defective area is already searched, sub control part 11 as defective area table making part 111 performs use area copy process.

Sub control part 11 reads the data of the above-mentioned common area where the defective area is already searched from defective area table 200 and sets them as defective area table 201.

For the example in FIG. 6, sub control part 11 copies the data of "area C" in defective area table 200 to defective area table 201 and set them up.

(Step S204)

Here, sub control part 11 as defective area table making part 111 performs a defective area table making process.

Sub control part 11 reads redundant area 400 of each block except having been set to use area 301 in auxiliary memory part 21 and having been copied and set by the above-mentioned use area copy processing to main memory part 20 and makes defective area table 201. Also, sub control part 11 sets as a defective area for areas other than use area 301 in auxiliary memory part 21 to defective area table 201.

According to the example of FIG. 6, in defective area table 201, for "area B," sub control part 11 searches a defective area and sets it to defective area table 200. Also, for "area A," main control part 10 sets all the areas as a defective area.

As above-mentioned, the defective area table making process according to the embodiment of the invention is ended.

Then, main control part 10 and sub control part 11 start the remaining control programs including OS. Main control part 10 and sub control part 11 expand the program and the data of image forming apparatus 1 needed for control of other application programs, or the like, from auxiliary memory part 21 to main memory part 20 and execute them. Thereby, the starting is completed.

The following effects can be obtained with a configuration as mentioned above.

Conventionally, in the technology of patent documents 1, at the time of an AMP configuration, each control part is needed to make a defective area table and starting time is elongated. That is, when the prior art is used, at the time of making of the defective area table, each control part is needed to read the information of the bad block in an auxiliary memory part, and time is needed.

As compared with this, image forming apparatus 1 according to the embodiment of the invention, is an AMP configuration provided with main control part 10 and sub control part 11 that control as a whole or a part, and auxiliary memory part 21 shared between main control part 10 and sub control part 11, comprising: use area specifying part 100 that specifies use area 300 in auxiliary memory part 21 where the program and data accessed by main control part 10 are memorized; use area specifying part 101 that specifies use area 301 in auxiliary memory part 21 where the program and data accessed by sub control part 11 are memorized; defective area table making part 110 that makes defective area table 200 for main control part 10, which is set the result of having searched whether or not a defective area only for use area 300 in auxiliary memory part 21 specified by use area specifying part 100 and is set as a defective area for the other area in the auxiliary memory part 21; and defective area table making part 111 that makes defective area table 201 for sub control part 11, which is set the result of having searched whether or not a defective area only for use area 301 in auxiliary memory part 21 specified by use area specifying part 101 and is set as a defective area for the other area in the auxiliary memory part 21.

As configured in this way, at the time of starting for image forming apparatus 1, time to read auxiliary memory part 21 for making defective area table 200 and 201 can be reduced, and starting can be accelerated. That is, in the present embodiment, as for main control part 10 or sub control part 11, since the information on redundant area 400 in the area of auxiliary memory part 21, which is not accessed by the self control part, is not read, the useless processes at the time of starting are reducible. For this reason, starting can be accelerated.

Also, as for main control part 10 or sub control part 11, since the area of auxiliary memory part 21, which is not accessed by a self control part, is set as a defective area in defective area tables 200 and 201, the stability of image forming apparatus 1 improves by preventing that the data of the area where other control parts access is destroyed by a malfunction of a control program, or the like.

Also, image forming apparatus 1 according to the embodiment of the invention, the defective area table making part, when the self control part is main control part 10 and there is defective area table 201 for sub control part 11 that is the other control part, or when the self control part is sub control part 11 and there is defective area table 200 for main control part 10 that is the other control part, and in addition to the already-searched area in respective defective area table 200 or defective area table 201 whether it is a defective area, is common with the use area for the self control part specified by use area specifying part 100 or use area specifying part 101, reads the data of the searched area in defective area table 200 or defective area table 201 for the other control part and sets to defective area table 201 or defective area table 200 for the self control part.

As configured in this way, for the area common to use areas 300 and 301, it becomes unnecessary to read redundant area 400 in auxiliary memory part 21, which read speed is relatively slow than main memory part 20, and can accelerate starting.

Also, image forming apparatus 1 related to an embodiment of the invention, auxiliary memory part 21 is a flash memory, and defective area tables 200 and 201 are tables in which redundant area 400 of each page for each block of the flash memory is read.

As configured in this way, useless reading process for the NAND flash memory can be reduced, and starting can be accelerated.

[Other Embodiments]

In addition, main control part 10 and sub control part 11 allows not to set use areas 300 and 301 for all blocks in auxiliary memory part 21 and make defective area tables 200 and 201, and thus it may set the defective area table only for a needed area. As configured in this way, starting can be accelerated.

Also, after making defective area tables 200 and 201, main control part 10 and sub control part 11 specifies a predetermined region may be write-protected as a defective area. Thereby, while main control part 10 and sub control part 11 executes OS or application software, it can prevent altering an important area by a computer virus, or the like. That is, the area where the computer virus, or the like, is memorized in auxiliary memory part 21 becomes not camouflaged to a bad block by the respective computer virus, or the like, and thus it can be erased. For this reason, security is raised.

Also, in the defective area table making process for the above-mentioned embodiment, although it is illustrated that only for sub control part 11 is searched whether the already-searched area of defective area table 200 is common to use area 300. However, it is not limited for this explanation. That is, for main control part 10, it may also be searched whether or not the already-searched area is common about defective area table 201.

As configured in this way, either in a case where main control part 10 starts beforehand or in a case where sub control part 11 starts beforehand, read from auxiliary memory part 21 can be reduced, and starting can be accelerated.

Also, in the above-mentioned embodiment, it is shown an example that both main control part 10 and sub control part 11 are present. However, it is not limited to the case. For example, it may be the configuration to have a boot control part only for boot, in addition to main control part 10 and sub control part 11, and the respective boot control part makes defective area table 201, or the like. That is, it may have two or more control parts, and it may be configured that each control part start in order.

As configured in this way, making of the defective area table by each control part can be optimized, and starting can be accelerated.

Also, in the above-mentioned embodiment, in FIG. 3, although an example that use area specifying table 210 is in use area 300 is shown. However, it is not limited to this configuration. For example, use area specifying table 210 may be set as use area 301. Also, use area specifying table 210 may be memorized in a partition, ROM, or the like, other than use area 300 and use area 301. Also, by main control part 10 and sub control part 11, respective use area specifying table 210 may be used.

As configured in this way, it can be supported even if it is a configuration that each of main control part 10 and sub control part 11 uses the different flash memory in auxiliary memory part 21, or the like.

Also, main control part 10 and sub control part 11 may use a different format, or the like, about defective area tables 200 and 201. For example, based on defective area table 200 made by main control part 10, a defective area table, such as a pointer-array form, may be set to sub control part 11. That is, main control part 10 may prepare the defective area table that can refer to blocks other than the bad block, continuously.

Thereby, main control part 10 and sub control part 11 can prepare the defective area table having a continuous area for the execution time of OS or application software.

Also, auxiliary memory part 21 is not limited for NAND flash memory, and it is also possible to make defective area tables 200 and 201 for a recording medium that has restriction in the number of times of rewriting, such as ReRAM, or the like, and is configured as like the above-mentioned embodiment. Also, if auxiliary memory part 21 is a HDD, it is also possible to make defective area tables 200 and 201 that use the information on a bad sector, or the like.

Also, the present invention is applicable also to information processing equipment other than an image forming apparatus. That is, it may be a configuration by using a network scanner, a server, which connects a separate scanner by USB, or the like.

Also, the configuration and operation of the above-mentioned embodiment are an example, and it cannot be over-emphasized that it can change suitably and can perform in the range that does not deviate from the aim of the present invention.

The invention claimed is:

1. An image forming apparatus of asymmetrical multi-processing comprising:
   a central processing unit (CPU) comprising a main control part and a sub control part;
   a main memory part that includes a Dynamic Random Access Memory (DRAM); and
   an auxiliary memory part that includes a NAND flash memory,
   wherein:
   the main control part reads a control program stored in the auxiliary memory part, expands the control program to the main memory part, and executes the control program to function as a first use area specifying part and a first defective area table making part;
   the sub control part reads the control program stored in the auxiliary memory part, expands the control program to the main memory part, and executes the control program to function as a second use area specifying part and a second defective area table making part;
   the main memory part stores a first defective area table made by the first defective area table making part and a second defective area table made by the second defective area table making part;
   the first defective area table and the second defective area table each include data for a bad block table that manages a bad block in the auxiliary memory part;
   the auxiliary memory part includes a first use area and a second use area, and stores a use area specifying table; and
   the use area specifying table includes data for information of a use area in the auxiliary memory part used by each of the main control part and the sub control part, and wherein:
the first use area specifying part specifies the first use area in the auxiliary memory part where a program and data are stored and are accessed by the main control part based on the use area specifying table;
the second use area specifying part specifies the second use area in the auxiliary memory part where a program and a data are stored and are accessed by the sub control part based on the use area specifying table;
the first defective area table making part makes the first defective area table for the main control part, which is set as a result of, with respect to the auxiliary memory part, only the first use area being searched for whether or not a bad block exists, wherein
the search area for the first defective area table making part is specified by the first use area specifying part, and
the first defective area table is further set to identify all use area in the auxiliary memory part, other than the first use area, as a bad block; and
when a) the second defective area table exists for the sub control part, and when b) a first common use area has already been searched for whether or not a bad block exists, and when c) bad block data corresponding to the first common area is identified in the second defective area table, and when d) the first common use area exists as a use area common to both the first use area used by the main control part and the second use area used by the sub control part,
the first defective area table making part reads the bad block data corresponding to the first common use area identified in the second defective area table and adds the read bad block data to the first defective area table used by the main control part;
the second defective area table making part makes the second defective area table for the sub control part, which is set as a result of, with respect to the auxiliary memory part, only the second use area being searched for whether or not a bad block exists, wherein
the search area for the second defective area table making part is specified by the second use area specifying part, and
the first defective area table is further set to identify all use area in the auxiliary memory part, other than the first use area as a bad block; and
when a) the first defective area table exists for the main control part, and when b) a second common use area has already been searched for whether or not a bad block exists, and when c) bad block data corresponding to the second common area is identified in the first defective area table, and when d) the second common use area exists as a use area common to both the second use area used by the sub control part and the first use area used by the main control part,
the second defective area table making part reads the bad block data corresponding to the second common use area identified in the first defective area table and adds the read bad block data corresponding to the second common use area to the second defective area table used by the sub control part.

2. The image forming apparatus according to claim 1, wherein the control program includes a boot loader and an Operating System (OS).

3. An image forming method executed by an image forming apparatus of asymmetrical multiprocessing having: a central processing unit (CPU) comprising a main control part and a sub control part; a main memory part that includes a Dynamic Random Access Memory (DRAM); and an auxiliary memory part that includes a NAND flash memory, the method comprising:
via the main control part,
reading a control program stored in the auxiliary memory part, expanding the control program to the main memory part, and executing the control program to function as a first use area specifying part and a first defective area table making part;
via the sub control part,
reading the control program stored in the auxiliary memory part, expanding the control program to the main memory part, and executing the control program to function as a second use area specifying part and a second defective area table making part;
via the main memory part,
storing a first defective area table made by the first defective area table making part and a second defective area table made by the second defective area table making part, wherein the first defective area table and the second defective area table each include data for a bad block table that manages a bad block in the auxiliary memory part;
via the auxiliary memory part,
including a first use area and a second use area, and storing a use area specifying table, wherein the use area specifying table includes data for information of a use area in the auxiliary memory part used by each of the main control part and the sub control part;
via the first use area specifying part,
specifying the first use area in the auxiliary memory part where a program and data are stored and are accessed by the main control part based on the use area specifying table;
via the second use area specifying part,
specifying the second use area in the auxiliary memory part where a program and a data are stored and are accessed by the sub control part based on the use area specifying table;
via the first defective area table making part, making the first defective area table for the main control part, which is set as a result of, with respect the auxiliary memory part, only the first use area being searched for whether or not a bad block exists, wherein
the search area for the first defective area table making part is specified by the first uses area specifying part, and
the first defective area table is further set to identify all use area in the auxiliary memory part, other than the first use area, as a bad block;
when a) the second defective area table exists for the sub control part, and when b) a first common use area has already been searched for whether or not a bad block exists, and when c) bad block data corresponding to the first common area is identified in the second defective area table, and when d) the first common use area exists as a use area common to both the first use area used by the main control part and the second use area used by the sub control part,
via the first defective area table making part, reading the bad block data corresponding to the first common use area identified in the second defective area and adding the read bad block data to the first defective area table used the main control part; and
via the second defective area table making part, making the second defective area table for the sub control part, which is set as a result of, with respect to the auxiliary memory part, only the second use area being searched for whether or not a bad block exists, wherein the search area for the second defective area table making part is specified by the second use area specifying part, and the first defective area table is further set to identify all use area in the auxiliary memory part, other than the first use area, as a bad block; and when a) the first defective area table exists for the main control part, and when b) a second common use area has already been searched for whether or not a bad block exists, and when c) bad block data corresponding to the second common area is identified in the first defective area table, and when d) the second common use area exists as a use area common to both the second use area used by the sub control part and the first use area used by the main control part, via the second defective area table making part, reading the bad block data corresponding to the second common use area identified in the first defective area table and adding the read bad block data of the second common use area to the second defective area table used the sub control part.

4. The image forming method according to claim 3, wherein the control program includes a boot loader and an Operating System (OS).

\* \* \* \* \*